June 28, 1955

G. E. MATHIAS ET AL 2,712,105

ALTERNATING CURRENT MOTOR CONTROL

Filed Nov. 19, 1952

WITNESSES:
John E. Heasley
E. F. Oberheim

INVENTORS
Gerald E. Mathias &
William T. Hunt Jr.
BY
Paul E. Friedemann
ATTORNEY June 28, 1955  G. E. MATHIAS ET AL  2,712,105
ALTERNATING CURRENT MOTOR CONTROL
Filed Nov. 19, 1952  4 Sheets-Sheet 2

WITNESSES:
John E. Heasley
E. L. Oberheim

INVENTORS
Gerald E. Mathias &
William T. Hunt Jr.
BY
Paul E. Friedemann
ATTORNEY

United States Patent Office 2,712,105
Patented June 28, 1955

2,712,105

ALTERNATING CURRENT MOTOR CONTROL

Gerald E. Mathias, Williamsville, N. Y., and William T. Hunt, Jr., Apex, N. C., assignors to Westinghouse Electric Corporation, East Pittsburgh, Pa., a corporation of Pennsylvania Application November 19, 1952, Serial No. 321,364

14 Claims. (Cl. 318—202)

This invention relates generally to systems of motor control and more in particular to systems for controlling an alternating current motor.

As a general proposition the present invention is directed to the control of an alternating current motor in which variable impedance means connected in the motor supply circuit is utilized to control the motor.

In a multiphase system to which the principles of this invention are generally applicable and with specific reference to a three-phase system for illustrative purposes only, a variable impedance device connected in each motor supply conductor may be utilized to control the motor terminal voltage in such a way as to provide speed torque characteristics suitable for a wide variety of applications.

A control of this type is also utilized in reversing the direction of rotation of a multiphase alternating current motor without disconnecting the motor from the supply by utilizing phase-shift means in connection with selectively controlled impedance means to effect a phase reversal and thereby reverse the rotation of the motor.

Systems of this general type appear in one of the assignee's patents numbered 2,228,078 to Finn H. Gulliksen and also Patent No. 2,550,569 to Lamm et al. Both of these patents illustrate arrangements involving reactors in which phase reversing control to reverse motor rotation is obtained by the application of direct current voltage of selective polarity to the control windings of the reactors. Such selective operation may be achieved by manual control or by automatic means such as shown in the Gulliksen patent wherein a bridge circuit is unbalanced in either direction in dependence of the sense of departure of a condition to be controlled from a given value.

A system involving certain of the basic principles generally referred to hereinbefore is illustrated herein. This system incorporates static types of electromagnetic controls which may be of the form of saturable reactors or magnetic amplifiers, magnetic amplifiers being shown.

According to one feature of this invention a system is provided for controlling an alternating current motor of the multiphase type in which provision is made for reversing the motor and controlling an operating characteristic thereof. The system, with respect to the control of the motor operating characteristic functions essentially as a closed loop regulator incorporating certain novel control aspects in respect of the selective reversing function and the control function.

In particular, one operating characteristic being controlled is motor speed, an indication of which is derived from a motor-driven pilot generator. If a wound rotor motor is employed in the system, speed approximations may be determined from electrical conditions in the secondary circuit and the pilot generator eliminated. Other electrical conditions of the motor may be controlled by such a system including load current and primary terminal voltage depending upon the requirements of a given application.

In one embodiment of this invention speed is controlled in dependence of a manually adjustable reference voltage which is compared with the pilot generator voltage for either forward or reversing operation to provide speed regulation under each operating condition.

In a second embodiment of this invention the alternating current motor is used as a pilot motor and its speed is controlled as a function of an electrical condition of a second motor which is under the control of the pilot motor.

With reference to such second embodiment, the electrical condition is current, that is the load current of the second motor. The general principles of this invention may be practiced whether the second motor is of the alternating current or direct current type. However, the invention is illustrated in connection with a slip regulator control for a wound rotor motor in which the alternating current pilot motor is used to control the secondary circuit resistance of a wound rotor induction motor. By proper organization of system components, the current cue provides both speed and directional intelligence for controlling the pilot motor.

One object of this invention is to provide a system of the class hereinbefore generally referred to which is simple with respect to operational requirements and positive in operation.

Another object of this invention is to provide a reversing control for an alternating current motor which requires no opening of the alternating current supply circuits and which inherently provides smooth regulated transition from forward to reversing operation.

It is also an object of this invention to provide good speed regulation with load change in a control for an alternating current motor.

Yet a further object of this invention is to provide an alternating current motor control in which all of motor reversing, motor speed regulation and adjustable speed control of the motor are incorporated.

Further to the preceding object it is also an object of this invention to provide such a system which inherently incorporates plugging during reversal and in stopping.

Yet another object of this invention is to provide a simple and effective slip regulator for an induction motor.

In a more specific sense, it is an object of this invention to provide a control of an electrical condition of a motor by a control motor in which said control motor is speed regulated in dependence of said electrical condition.

Further to the preceding object it is also an object thereof to control the direction of rotation of the control motor in dependence of said electrical condition.

The foregoing statements are merely illustrative of the various aims and objects of this invention. Other objects and advantages will become apparent upon a study of the following specification when considered in conjunction with the accruing drawings, in which:

Figure 1:
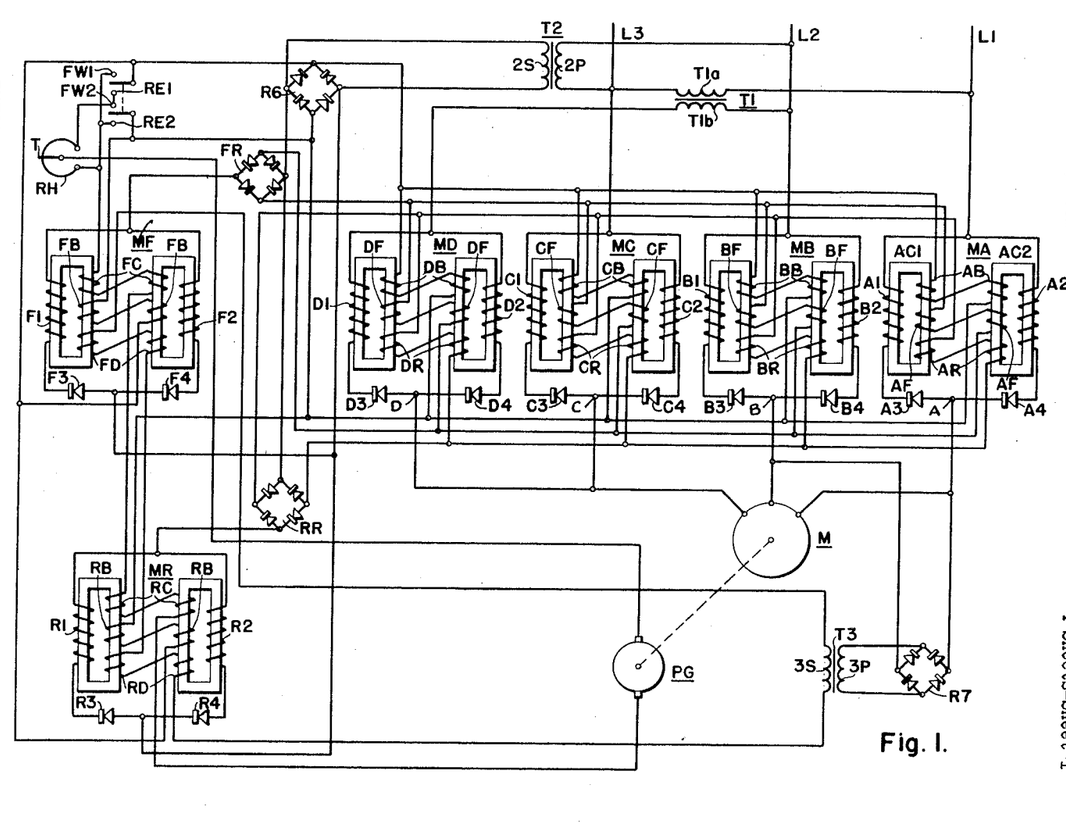
Figure 1 is a diagrammatic illustration of an alternating current motor control system embodying the principles of this invention.

In Fig. 1 the motor to be controlled is designated M.

For the purposes of these considerations, motor M is illustrated as a squirrel-cage type of alternating current motor of the three-phase type which is connected to a three-phase supply of alternating current represented in conductors L1, L2 and L3. It is to be understood, however, that other types of alternating current motors may be controlled in accordance with the general principles of this invention.

Speed and reversing control of this alternating current motor are achieved by suitable control of a plurality of doubler magnetic amplifiers respectively designated MA, MB, MC and MD. The main windings A1, A2 and B1, B2 and C1, C2 of respective magnetic amplifiers MA, MB and MC are connected in parallel with each other and in series with the motor in respective supply conductors L1, L2 and L3. The parallel connected main windings D1 and D2 of magnetic amplifier MD are connected in series with the winding T1b of a transformer T1 between a point on supply conductor L2 on the supply side of magnetic amplifier L2 and a point on conductor L3 on the motor side of magnetic amplifier MC. A second winding of transformer T1 designated T1a is connected across supply conductors L1 and L3. All of the aforesaid magnetic amplifiers have a self-saturating rectifier connected in series with each main winding. These rectifiers which are oppositely poled in the respective parallel main winding branches of each amplifier are designated, A3, A4 and B3, B4 and C3, C4 and D3, D4.

Figure 2:
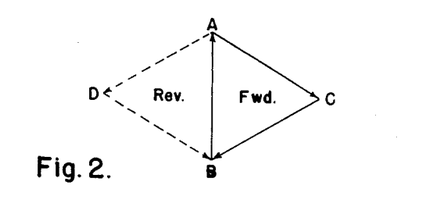
Fig. 2 is a vector diagram illustrating the relationship of the phase voltages for both forward and reversing modes of motor operation.

In the vector diagram of Fig. 2, the phase voltages for forward and reverse operating conditions are shown. The solid arrows indicate the phase relationship existing for the forward mode of operation, which corresponds to that control condition in which the magnetic amplifiers MA, MB and MC are utilized in controlling the motor terminal voltage. The dotted arrows indicate the phase relationships in reverse operation of the motor in which the magnetic amplifiers MA, MB and MD are utilized in controlling motor terminal voltage. The indicia A, B, C and D on the vector diagram of Fig. 2 identify the phase voltages at A, B, C and D in the network of Fig. 1. The 180-degree electrical phase shift between C and D is achieved by use of the transformer T1 which shifts the phase voltage at D 180 electrical degrees with respect to the phase voltage at C. Phase rotation A—B—C corresponds to 1—3—2 at the motor and phase rotation A—B—D corresponds to 1—2—3 at the motor.

The magnetic amplifiers in Fig. 1 are shown with separate closed loop cores for each main winding, i. e., referring to amplifier MA, respective cores AC1 and AC2 have wound thereon respective main windings A1 and A2. Each control winding comprises two series connected parts, one on one core and the other on the other core, for example, control winding AR comprises two series parts, part on core AC1 and part on core AC2. For the purpose of this discussion these two parts and all other similar windings are treated as a single winding.

With the means thus far described, reversal in rotation of the motor is therefore achievable by selectively utilizing either the magnetic amplifier MC or the magnetic amplifier MD in conjunction with magnetic amplifiers MA and MB in controlling the motor terminal voltage. The specific means whereby this selective control is achievable will be described hereinafter.

Each of the four magnetic amplifiers utilized in controlling motor terminal voltage are provided with three windings. In each case two of these windings are control windings selectively utilized for forward and reversing control and the remaining winding is a bias winding which in each instance biases the associated magnetic amplifier substantially to minimum output. The forward and reversing control windings of the respective magnetic amplifiers are respectively designated AF, AR and BF, BR and CF, CR and DF, DR. The respective bias windings are designated AB, BB, CB and DB.

All of the forward control windings AF, BF, CF and DF are connected in parallel in an excitation circuit supplied by the full wave load rectifier FR of forward magnetic amplifier MF and similarly, all of the reverse control windings AR, BR, CR and DR are connected in parallel in an excitation circuit supplied by the load rectifier RR of reverse magnetic amplifier MR. This system will be discussed at a later point. However selective operation of the respective forward and reverse magnetic amplifiers selectively energizes the paralleled forward and reverse control winding groups.

Figure 3:
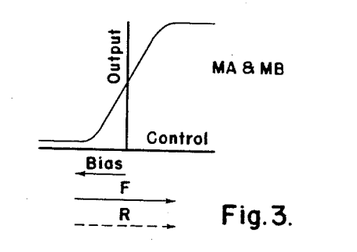
Figs. 3 through 7 graphically illustrate the control characteristics of the respective magnetic amplifiers involved in the present system of control.

By reference to the characteristic curves of Figs. 3 through 7, it will be seen that in each instance the bias ampere turns bias the respective magnetic amplifiers to points of minimum output or substantially to the point of minimum linear output. In connection with magnetic amplifiers MA and MB the characteristics of which are illustrated in Fig. 3, the forward and reverse control windings provide ampere turns in the direction illustrated by the respective solid and dotted arrows designated F and R. These arrows, it will be observed, indicate ampere turns in the same direction which drive the cores of these magnetic amplifiers towards saturation.

Figures 4, 5:
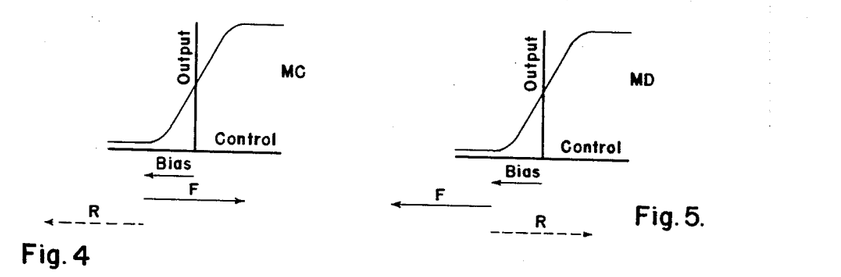

In Fig. 4 the ampere turns of forward control winding CF represented by the solid arrow F drive magnetic amplifier MC into its conducting range and the ampere turns of control winding CR represented by the dotted arrow R drive magnetic amplifier MC further into the minimum output range to positively maintain this amplifier at a point of minimum output.

In Fig. 5 the characteristics of magnetic amplifier MD are illustrated. The response of this amplifier to forward and reverse control voltages is just the opposite to that of magnetic amplifier MC. In this instance the ampere turns of the forward control winding DF drive this amplifier further into the range of minimum output, thus assuring that this amplifier is effectively cut off at the time magnetic amplifier MC responds to the applied control voltage. The ampere turns of the reverse control winding DR drive magnetic amplifier MD into conducting range at the time magnetic amplifier MC is driven further into its minimum output range, thus assuring that when magnetic amplifier MD is operating in response to a given control voltage, the magnetic amplifier MC will be effectively cut off.

Reviewing this situation generally, it will be seen that upon application of excitation voltage to either the forward control windings or the reverse control windings of magnetic amplifiers MA and MB, these magnetic amplifiers are driven into their conducting range, while at the same time, due to the selective response of magnetic amplifiers MC and MD to the same control voltages, only one of the two last-named magnetic amplifiers will conduct. These magnetic amplifiers are all arranged so that equal simultaneous response of the operating amplifiers in response to a given control voltage is obtained so that balanced operation of the alternating current motor is achieved.

Figures 6, 7:
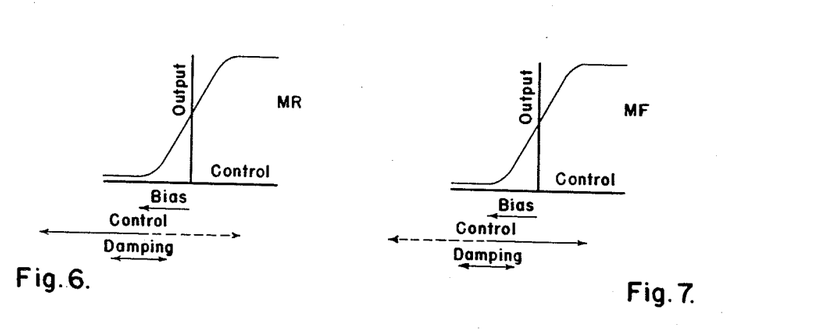

Selective control of the system for forward and reverse operation is achieved by means of the previously mentioned forward and reversing magnetic amplifiers respectively designated MF and MR. These magnetic amplifiers are similar to those utilized in the motor supply circuit being of the self-saturating parallel-connected doubler type. Magnetic amplifier MF includes a pair of main field windings F1 and F2, respectively connected in series with respective rectifiers F3 and F4. These rectifiers are oppositely poled in the parallel-connected main winding circuits to pass current in opposite directions on alternate half cycles of alternating current. This amplifier is connected to a supply of alternating current, derived from conductors L2 and L3 of the motor supply system through a transformer T2, the secondary winding 2S of which supplies alternating current to the forward and reverse magnetic amplifier circuit. A load rectifier FR is connected in series with the main winding circuit of magnetic amplifier MF and provides full wave rectified output voltage. Magnetic amplifier MF includes a control winding FC, a damping winding FD and a bias winding FB. The characteristic of this magnetic amplifier is illustrated in Fig. 7 wherein the ampere turns of bias winding FB bias this magnetic amplifier substantially to minimum output.

Magnetic amplifier MR is similar to magnetic amplifier MF and comprises a pair of main windings R1 and R2 respectively connected in series with rectifiers R3 and R4 which are oppositely poled in the respective branches. This main winding circuit is connected in series with a load rectifier RR across the same supply of alternating current described in connection with magnetic amplifier MF. Reverse magnetic amplifier MR also comprises a control winding RC, a damping winding RD and a bias winding RB. The characteristic of this amplifier appears in Fig. 6 wherein again the ampere turns of bias winding RB, indicated by the solid arrow designated BIAS, bias this amplifier to minimum output.

Two functional aspects of the system are controlled by the control winding circuits of the magnetic amplifiers MF and MR. The first of these may be identified as the forward and reverse control for the motor and the second of these as the speed adjustment and speed regulation control of the motor.

Both of these control functions depend upon the comparison of a pair of voltages in the control winding circuit for the forward and reverse magnetic amplifiers. One of these voltages is a reversible polarity reference voltage derived from a rheostat designated RH and the second of these voltages is a speed indicating voltage produced by a pilot generator designated PG, the rotor of which is connected mechanically in any suitable way to the alternating current motor M to be driven thereby. A generator of this type for an application such as this, as is well known, produces a voltage which is a linear function of its speed of rotation. Hence in view of the mechanical connection of this generator with the induction motor the voltage output of the pilot generator is proportional to the speed of the motor.

Energization of rheostat RH is derived from the output of a full-wave rectifier designated R6, the input of which is connected across the secondary winding 2S of the transformer T2, and controlled as to polarity by its connection in a switch network including respective pairs of forward and reverse contacts FW1, FW2 and RE1, RE2. Selective operation of the forward contactors or the reverse contactors switches the ends of rheostat RH between points of opposite polarity across the output terminals of rectifier R6 to reversibly energize the rheostat depending upon which of the forward and reverse contactors are operated. No attempt has been made at this point to detail the particular manner in which these forward and reversing contacts are operated since such control, be it manual or automatic, forms no essential part of the present invention.

Rheostat RH is provided with an adjustable tap designated T by which a variable direct current voltage is tapped from the rheostat. This tapped rheostat voltage is the reference voltage of the system and its magnitude determines the speed at which the induction motor will be operated. This tapped portion of the rheostat is connected in a series loop in opposition to the output voltage of the pilot generator when the motor is operating in a given direction, which series loop includes the control field windings FC and RC of the respective forward and reverse magnetic amplifiers. The output of load rectifier FR is applied across the forward control windings AF, BF, CF and DF of the respective motor controlling magnetic amplifiers MA, MB, MC and MD and the output of load rectifier RR of the reverse magnetic amplifier is connected across reverse control windings AR, BR, CR and DR of amplifiers MA, MB, MC and MD respectively as previously described. Thus by selective operation of the respective forward and reverse magnetic amplifiers either the forward control winding or the reverse control winding of each of magnetic amplifiers MA, MB, MC and MD will be energized to correspondingly control the motor.

By reference now to Figs. 6 and 7 the selective control of forward and reverse magnetic amplifiers MF and MR will be appreciated. Assuming that the motor is to be run in the forward direction, the forward contacts FW1 and FW2 will be closed, applying a voltage of one polarity across the rheostat RH. The polarity of this voltage is such, as will be seen from Figs. 6 and 7 and indicated by the solid arrows marked "Control," that magnetic amplifier MF will be biased in the direction of saturation while at the same time magnetic amplifier MR will be biased further into its minimum output range and consequently, effectively cut off from operation. For this condition, during the starting interval, the control of magnetic amplifier MF will be primarily due to the voltage of rheostat RH, since the motor is starting from standstill and coming up in speed, which means that the pilot generator voltage increases from zero. The output of load rectifier FR appears across all of the control windings AF, BF, CF and DF.

For this condition of operation, as will be observed by reference to Fig. 3, both magnetic amplifiers MA and MB, as shown by the solid arrow designated F, will be biased towards saturation and, hence, will conduct in an amount depending upon the control ampere turns. As will be seen by reference to Fig. 4, magnetic amplifier MC will also be conducting since the control ampere turns designated F in Fig. 4, drive this amplifier towards saturation. For balanced operation the change in output characteristic in each instance will be the same. By reference to Fig. 5, it will be seen that control ampere turns designated by the solid arrow marked F, bias amplifier MD further into its minimum output range and effectively remove this amplifier from operation. Under this condition magnetic amplifier MD is effectively a large impedance producing a very negligible effect on the performance of the motor.

With the connections thus described the motor accelerates in the forward direction. The steady state speed will be one where the pilot generator voltage nearly matches the reference voltage. Regulation of speed now takes place about that speed value which is determined by the setting of the rheostat RH. For example, if the motor speed should tend to increase at this reference voltage setting the output of the pilot generator will also increase. Thus, the output voltage of the pilot generator more closely approaches the reference voltage and the control ampere turns of control winding FC decrease. This increases the impedance of magnetic amplifier MF and as a consequence, its output voltage drops. This drop in output voltage simultaneously affects the control windings of each magnetic amplifier MA, MB and MC resulting in simultaneous impedance increases in each case. This drop in output voltage of each of the magnetic amplifiers last-named results in a drop in voltage applied to motor M. As a consequence the speed of the motor tends to drop. Equilibrium is reached at that point wherein the differential between the pilot generator voltage and the rheostat voltage provides the required control voltage to tend to maintain motor speed for the instant condition of load torque. It will be appreciated that if variations in load torque occur for a given speed setting that the motor speed may be slightly different from that which existed at the previous condition of load torque. However, tests have indicated that the speed torque characteristic over the range of control up to pull out remains remarkably flat. In fact, the character of control obtained with this arrangement corresponds in this respect to that which is obtainable with the more complicated and expensive conventional types of direct current variable voltage drives.

Under this condition of operation if it is desired to adjust the speed of the motor to some different value, the tap of rheostat RH is adjusted to some new setting, either higher voltage or lower voltage depending upon whether the speed is to be increased or decreased respectively. The resulting change in excitation of the respective control windings of the motor controlling magnetic amplifiers, produces a change in motor speed in the proper direction. Equilibrium is again reached at that point at which the pilot generator output voltage approaches the rheostat voltage.

For the assumed operating condition, namely in the forward direction, to stop the motor, the forward contacts FW1 and FW2 are opened. This immediately deenergizes the reference rheostat and removes the reference voltage from the control winding circuit of the forward and reversing magnetic amplifiers. The voltage remaining in this loop is now that due to the pilot generator PG. As a consequence the excitation of respective control windings FC and RC is reversed. This excitation is represented by the dotted arrows in Figs. 6 and 7 respectively. With respect to the reverse magnetic amplifier MR, the resulting ampere turns bias this amplifier towards saturation and with respect to the forward magnetic amplifier, the resulting ampere turns bias this amplifier into its minimum output region. Amplifier MF now becomes nonconducting substantially at the time amplifier MR becomes conducting and the control is shifted from the forward control windings of the motor controlling magnetic amplifiers to the reverse control windings, respectively designated AR, BR, CR and DR. For this condition, by reference to Fig. 3, the dotted arrow designated R indicates that magnetic amplifiers MA and MB remain conducting in dependence of the ampere turns produced by this excitation. The dotted arrows in Figs. 4 and 5 respectively indicate that magnetic amplifier MC is now biased into its minimum output range and magnetic amplifier MD is biased into its conducting range. By reference to the vector diagram of Fig. 2 it will be seen that phase reversal occurs from this connection. This is indicated as previously explained by the dotted arrows. The connection thus obtained results in plugging of the motor. That is, the excitation at this time is in a direction which tends to reverse the motor. However, since this excitation is due only to the output of the pilot generator, the decelerating effect which is obtained is directly proportional to speed and, hence, diminishes in direct proportion to the dropping speed of the motor. At the instant the motor stops the plugging action ceases.

If under the assumed condition of forward operation it had been desired to reverse the motor, contacts FW1 and FW2 would be opened and contacts RE1 and RE2 would be closed. The polarity of the direct current voltage applied across the reference rheostat RH is now reversed and consequently the reference voltage in the control winding loop of the forward and reverse magnetic amplifiers is also reversed and is now of the same polarity as the output of the pilot generator PG. As previously described in connection with stopping of the motor, this action cuts off the forward magnetic amplifier and produces conduction of the reverse magnetic amplifier, but in this case with the added effect of the reference voltage working on the reverse control winding RC. The motor is thus rapidly plugged to standstill and during this plugging operation the pilot generator voltage is diminishing, becoming zero when the motor reaches zero speed. However, the voltage of the reference rheostat yet appears across the control winding RC and as a consequence the phase reversal in motor excitation is maintained. The motor now accelerates in the reverse direction of rotation and is speed regulated in dependence of the magnitude of the reference voltage.

As in most closed loop regulators a degree of damping of system operation may be desired to provide adequate system stability. Such damping is achievable by controlling the damping windings FD and RD of the respective forward and reverse magnetic amplifiers by means of a direct current voltage derived from one phase of the motor supply circuit. Inasmuch as the outputs of all the motor controlling magnetic amplifiers change in corresponding amounts to provide balanced excitation of the motor, this indication of damping from one phase of the motor system is adequate. This measure of magnetic amplifier output is rectified by means of a full wave rectifier R7, the output of which is applied to a damping transformer T3 having a primary winding 3P connected across the direct current terminals of the full-wave rectifier and having a secondary winding 3S connected in a series loop with respective damping windings FD and RD. As will be observed by reference to Figs. 6 and 7 the damping ampere turns selectively act in both directions in the respective forward and reverse magnetic amplifiers.

The damping action is such as to oppose a change in output voltage of the system. For example, assume that the motor forward speed has suddenly increased. The pilot generator voltage increases correspondingly and more closely approaches the voltage of the reference rheostat. The reduction in ampere turns of control winding FC reflected through the motor controlling magnetic amplifiers tends to reduce the voltage at the terminals of the alternating current motor. This change in voltage appearing across the damping transformer T3, is reflected in the damping winding FD, the ampere turns of which in this instance are in a direction to drive the forward magnetic amplifier further into its conducting range and, hence, tend to increase the output in dependence of the rate of voltage drop at the motor terminals. If the motor speed drops, this condition is reflected as an increase in motor terminal voltage. This results in the application of a control voltage to damping winding FD of reversed polarity with respect to that previously described. The ampere turns now acting on the forward magnetic amplifier due to the damping winding now tend to bias this amplifier towards its minimum output range tending thereby to limit the output of the amplifier in dependence of the rate of increase of motor terminal voltage.

Figure 8:
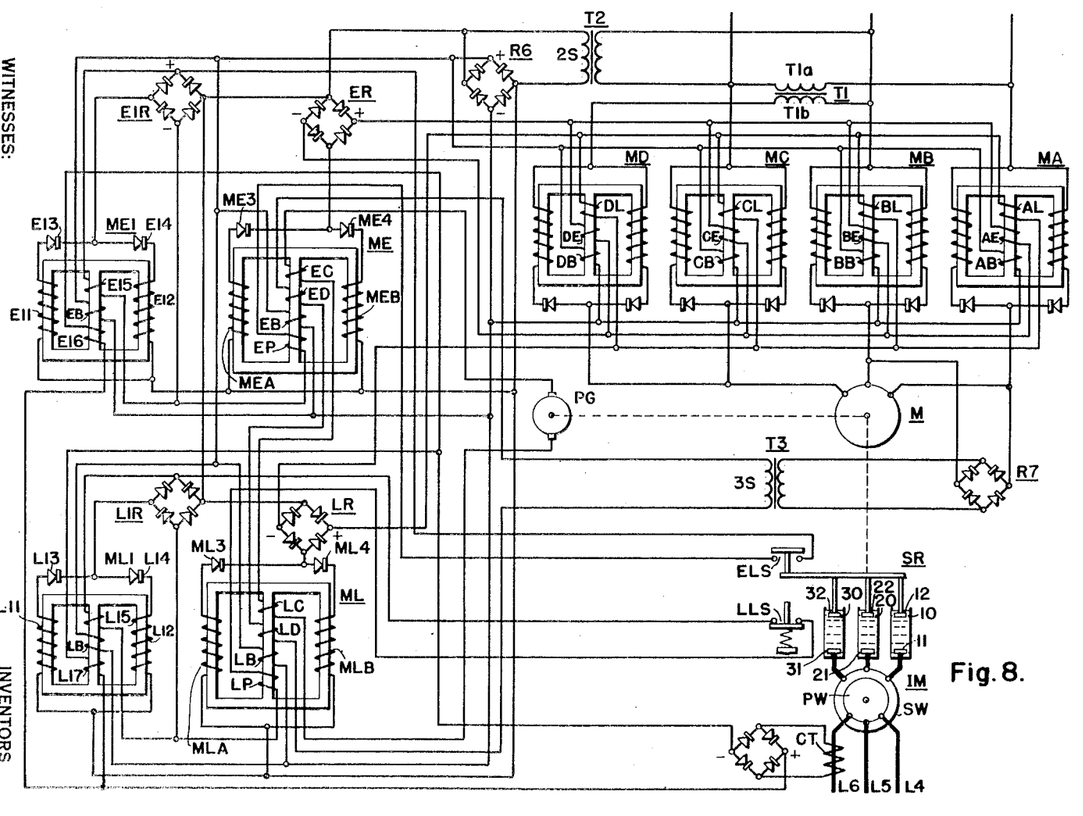
Fig. 8 is a diagram illustrating a slip regulator control for an induction motor, the system embodying the principles of this invention.

The principles embodied in the preceding subject matter appear also in the embodiment of this invention illustrated in Fig. 8 which relates to a slip regulator system and which corresponds to the second embodiment of this invention mentioned in the opening paragraphs of this specification.

In Fig. 1, the magnetic amplifiers were shown with separate closed loop cores for each main winding. In Fig. 8, the respective magnetic amplifiers are illustrated with three legged cores, in which the main windings are mounted on respective legs and the control windings on a common leg. This is done as a matter of drawing convenience. These two types of amplifiers while physically different for patent purposes are regarded as equivalents.

The motor to be controlled in Fig. 8 is an alternating current induction motor generally designated IM having a primary winding PW connected to alternating current mains L4, L5 and L6. This motor is controlled by controlling the secondary winding circuit resistance by means of suitable resistance devices connected in circuit with the secondary winding SW. This control of an induction motor is usually referred to as slip regulation and the resistance means for accomplishing such control is generally known as a slip regulator. Slip regulators may be any one of several types and that chosen for illustration here is of the liquid rheostat type which is usually employed on large horse power induction motors.

The illustrated slip regulator SR comprises three liquid rheostats generally designated 10, 20 and 30, respectively connected in series with the three branches of the secondary winding in keeping with conventional practice.

The respective slip regulators, each comprise stationary electrodes 11, 21 and 31 and movable electrodes 12, 22 and 32. These electrodes are positioned within a tank which is filled with a suitable electrolyte so that resistance variations in the respective circuits are obtained by adjusting the relative positions of the electrodes. In practice the moving electrodes are mechanically ganged and actuated simultaneously by some suitable means.

According to this embodiment of this invention the moving electrodes of the slip regulator are driven by an alternating current motor M which corresponds to the motor M described in Fig. 1. The portion of the system embodying respective amplifiers MA, MB, MC and MD together with the principles of operation thereof is the same as the corresponding portion of Fig. 1. Consequently, such parts bear like reference characters and the function of this portion of the system will be understood in connection with the discussion concerning Fig. 1.

One of the electrical conditions of the induction motor which is to be controlled is the load current. Accordingly the system of Fig. 8 is arranged so that the motor M, which may herein be referred to as a pilot motor, operates the slip regulator in such a manner as to maintain the load current of induction motor IM at some predetermined value. Accordingly, the system is arranged so that for current levels above a given magnitude, the slip regulator is operated to increase the secondary winding circuit resistance and for values of load current below a given magnitude, the system operates to reduce the secondary winding circuit resistance.

As a general rule a system of this type is started with the moving electrodes disposed at their maximum distance from the stationary electrodes. Thus when the motor is connected to the power mains, the load current is minimized. Thereafter to increase the motor speed, it is necessary to reduce the electrode separation to reduce the secondary winding circuit resistance. With the system herein under consideration, the lowering of the moving electrodes continues until such time as the load current approaches a predetermined magnitude at which time the system operates to regulate the load current at the desired level.

This character of control indicates a need for reversible movement of the moving electrodes of the slip regulator in dependence of departures of the load current from said predetermined magnitude both above and below. Such directivity sense with respect to load current excursions is obtained by the use of properly biased magnetic amplifiers generally designated ME1, which is the amplifier controlling the elevating of the moving electrodes, and ML1, which is the amplifier controlling the lowering movement of the moving electrodes.

Amplifier ME1 comprises respective main windings E11 and E12 having respective self saturating rectifiers E13 and E14 connected in series therewith. The self-saturating rectifiers are poled in opposite senses in the parallel branches of the main winding circuits and the main winding circuit is connected across the secondary winding 2S of transformer T2 in series with the alternating current terminals of a full-wave rectifier E1R. This magnetic amplifier is controlled by means of a control winding E16 which is connected across the output terminals of a full-wave rectifier R5 which is in turn energized by a current transformer CT associated with one of the power mains supplying the induction motor. Thus, an indication, in terms of ampere turns, of load current of the induction motor is applied as a control to the magnetic amplifier ME1. Magnetic amplifier ME1 is further provided with a bias winding EB and a differential winding E15 which is connected across the output terminals of load rectifier E1R to provide a degree of damping in the control function of this amplifier.

Magnetic amplifier ML1 is physically similar to magnetic amplifier ME1 comprising main windings L11 and L12 respectively connected in series with oppositely poled self-saturating rectifiers L13 and L14 in parallel circuit branches. The parallel-connected main winding circuit is connected in series with the alternating current terminals of a full-wave rectifier L1R across the secondary winding 2S of transformer T2. Control winding L17 of this amplifier is connected across the output terminals of rectifier R5 and the bias winding LB is connected across the output terminals of full-wave rectifier R6.

Figure 14:
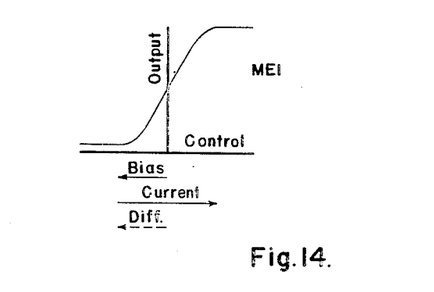
Figure 15:
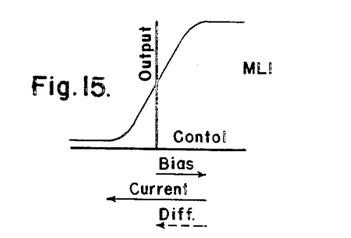

The characteristics of magnetic amplifiers ME1 and ML1 are illustrated respectively in Figs. 14 and 15. From this it will be seen that the ampere turns of bias winding EB of magnetic amplifier ME1 bias this amplifier into its minimum output range. Similarly the ampere turns of the differential winding E15 represented by the dotted arrow bias this amplifier towards its minimum output range, while the ampere turns of control winding E16 energized in dependence of the load current of the induction motor bias this amplifier towards saturation.

With regard to magnetic amplifier ML1, the bias winding ampere turns bias the magnetic amplifier into its conducting range. The ampere turns of the current winding bias the amplifier towards minimum output and similarly the differential ampere turns also bias the amplifier towards its minimum output range.

The output terminals of rectifiers E1R and L1R are connected across respective pattern windings EP and LP of magnetic amplifiers ME and ML. These pattern winding circuits include in series therein respective limit switches ELS and LLS which are normally closed excepting when the moving electrodes are in their upper and lower positions respectively. These switches afford a control which prevents moving the moving electrodes in either direction beyond given mechanical limits.

Amplifiers ME and ML, which are controlled by respective pattern windings EP and LP, each comprise a pair of main windings. With respect to amplifier ME the main windings are designated MEA and MEB and are respectively connected in series with self-saturating rectifiers ME3 and ME4 in a parallel circuit arrangement. This parallel-connected main winding circuit is connected in series with the alternating current terminals of full-wave load rectifier ER across the alternating current supply of transformer T2. This amplifier is provided with a control winding EC, a damping winding ED and a bias winding EB along with the pattern winding EP.

Magnetic amplifier ML comprises main windings MLA and MLB connected in series with respective self-saturating rectifiers ML3 and ML4 in a parallel circuit. This parallel main winding circuit is connected in series with the alternating current terminals of full-wave load rectifier LR across the supply of alternating current provided by transformer T2. This amplifier includes a control winding LC, a damping winding LD, a bias winding LB along with the mentioned pattern winding LP. Respective control windings AE, BE, CE, and DE of magnetic amplifiers MA, MB, MC and MD are connected in parallel across the output terminals of load rectifier ER. Similarly control windings AL, BL, CL and DL of the last-named magnetic amplifiers are connected in parallel across the output terminals of load rectifier LR.

In this embodiment of the present invention the control windings EC and LC of amplifiers ME and ML, which correspond in some respects to amplifiers MF and MR of Fig. 1, are connected in series across the output of pilot generator PG which as before is driven by the speed regulated motor M. In this instance, however, these windings receive no other excitation, unlike the arrangement in Fig. 1 wherein windings such as EC and LC were additionally excited in dependence of a selected reference voltage.

Corresponding control is achieved, in this instance, by comparing ampere turns rather than actual voltages in respective amplifiers ME and ML of this embodiment of the invention. In the present arrangement the ampere turns of respective pattern windings EP and LP are compared with the ampere turns of respective control windings EC and LC. Respective damping windings ED and LD of magnetic amplifiers ME and ML are connected in series across the secondary winding 3S of damping transformer T3, the primary of which is again energized in dependence of the voltage across conductors L1 and L2 of the supply circuit motor M. Bias windings EB and LB are connected in parallel across the output terminals of rectifier R6.

Figure 12:
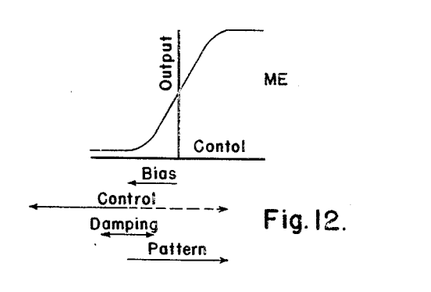
Figure 13:
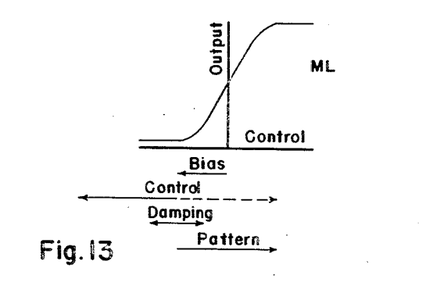

The characteristics of magnetic amplifiers ME and ML are represented in Figs. 12 and 13 respectively. In Fig. 12 it will be seen that magnetic amplifier ME is biased to its minimum output range by the ampere turns of bias winding EB. The control ampere turns of winding EC for that polarity of pilot generator voltage existing when motor M is elevating or raising the moving electrodes of the slip regulator is represented by the solid arrow. The dotted arrow directed in the opposite direction to the solid arrow, represents the ampere turns which exist when the pilot generator voltage is reversed due to rotation of pilot motor M in the direction to lower the moving electrodes of the slip regulator. The damping ampere turns act in a direction to oppose a change of voltage across the terminals of the pilot motor. This damping action is the same as that described in connection with Fig. 1.

In Fig. 13 it will be seen that magnetic amplifier ML is biased to its minimum output range. The control ampere turns represented by the solid arrow which bias this amplifier into its minimum output range result from that polarity of pilot generator voltage existing when the pilot motor M is rotating in a direction to lower the moving electrodes. The dotted arrow which is directed oppositely to the solid arrow represents the ampere turns existing when the motor M is rotating in a direction to raise the moving electrodes. Here again the damping ampere turns act in a direction to oppose a change in voltage at the terminals of the pilot motor. In each of Figs. 12 and 13 the pattern ampere turns bias the respective amplifiers ME and ML towards conduction.

Figure 9:
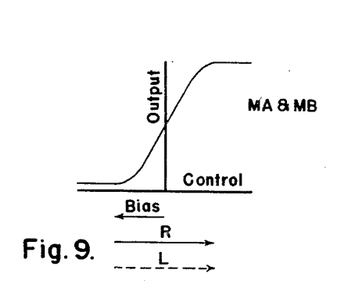
Figs. 9 through 15 graphically illustrate the control characteristics of the respective magnetic amplifiers embodied in Fig. 8.
Figure 10:
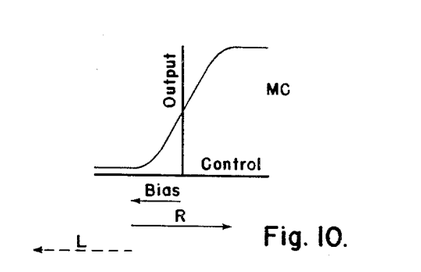
Figure 11:
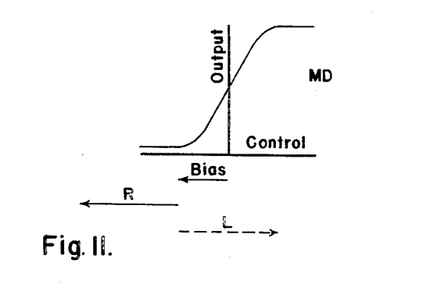

Figs. 9, 10 and 11 illustrate the characteristics of the magnetic amplifiers connected in the supply circuit of motor M. The characteristics here correspond to those of the corresponding amplifiers of Fig. 1. Each of these amplifiers is biased into its minimum output range by the respective bias windings. Amplifiers MA and MB are both biased towards conduction regardless of which of the control windings are energized. Selectivity of control by selectively energizing the respective control windings of magnetic amplifiers MC and MD is obtained as will be apparent from Figs. 10 and 11 wherein, the ampere turns of control winding CE shown in Fig. 8 bias amplifier MC towards conduction, whereas the ampere turns of control winding DE, energized when CE is energized, bias magnetic amplifier MD into its minimum output range. As will be seen from Fig. 10 the ampere turns of winding CL bias amplifier MC into its minimum output range while the ampere turns of winding DL bias amplifier MD into its conducting range at the time winding CL biases amplifier MC into its minimum output range.

In the interest of simplicity, the conventional contactors or control switches which are utilized in a system of this type for starting, stopping and providing other auxiliary control functions have been eliminated.

To start the present system, the alternating current supply circuits L1, L2 and L3 for the pilot motor are energized and at the same time the induction motor IM is connected to its supply of electrical energy. The alternating current and direct current control voltages are supplied to the system by the transformer T2 and rectifier R6 respectively at the time conductors L1, L2 and L3 are energized. As earlier mentioned, the induction motor IM is started with the electrodes of the slip regulator at maximum separation. Hence, when the system is energized, magnetic amplifier ML1 begins to conduct. This will be appreciated by reference to Fig. 15 where it will be seen that the bias winding LB biases this amplifier into its conducting range. With the electrodes at maximum separation, the load current will be held at some low value and consequently, the ampere turns of control windings L17 will be some small value. The output of magnetic amplifier ML1 is applied across the pattern winding LP of magnetic amplifier ML. This output is sufficient to overcome the ampere turns of the bias winding LB and by reference to Fig. 13 it will be seen that the net ampere turns bias this magnetic amplifier into its conducting range. The output of magnetic amplifier ML is now applied across the parallel-connected control windings AL, BL, CL and DL of the pilot motor magnetic amplifiers. By reference to Figs. 10 and 11 it will be seen that magnetic amplifier MC is effectively cut off by the bias of winding CL and that magnetic amplifier MD is biased into its conducting range by the ampere turns of winding DL. This mode of excitation of pilot motor M is such as to drive it in a direction to lower the moving electrodes of the slip regulator.

As the moving electrodes are lowered the resistance of the slip regulator decreases and the induction motor begins to drive the load. Over this range of load acceleration the system is regulated in dependence of the load current. As the load current increases it will be seen by reference to Fig. 15 that the ampere turns of control winding L17 increase tending to drive magnetic amplifier ML1 towards its minimum output range. At the same time the ampere turns of control winding E16 are increasing tending to overcome the ampere turns of bias winding EB to cause conduction of amplifier ME1. At a point corresponding to the selected magnitude of load current of induction motor IM about which regulation is to take place, amplifier ML1 is biased substantially to minimum output and amplifier ME1 begins to conduct. At this transition point the pattern excitation of amplifier ML drops substantially to zero and the pattern excitation of amplifier ME begins to increase. Thus, the system is effectively switched by this amplifier action so that phase reversal is achieved in the supply for the pilot motor M. Thus, when the load current increases above the selected value, magnetic amplifier ME is caused to conduct and, when the load current drops below the selected value, magnetic amplifier ML is caused to conduct.

Under each of the raise or lower conditions of operation of the slip regulator, the output of the pilot generator PG acts on respective magnetic amplifiers ME and ML in such a way as to oppose the pattern ampere turns. This will readily be seen by reference to Figs. 12 and 13. Considering, for instance, magnetic amplifier ML and assuming the electrodes are being lowered by the pilot motor, the ampere turns due to the instant polarity of the pilot generator PG when the pilot motor M is lowering the electrodes are represented by the solid arrow. These ampere turns oppose the pattern ampere turns acting on amplifier ML at this time. At the same time the ampere turns acting on magnetic amplifier ME due to excitation of control winding EC by the pilot generator output tend to bias magnetic amplifier ME towards conduction. This is represented by the dotted arrow in Fig. 12. The relative values of control ampere turns and bias ampere turns in the respective amplifiers ME and ML are preferably so proportioned that under such operating conditions the amplifier ME in this specific instance is maintained at minimum output and conversely when amplifier ME is conducting and the pilot generator voltage reversed, the ampere turns of winding LC of amplifier ML will not cause amplifier ML to conduct.

Due to the comparison of the pattern ampere turns and the control ampere turns in the respective amplifiers ME and ML, it will be appreciated that pilot motor M is operated at a speed corresponding to the differential of the pattern and control ampere turns of the amplifier which happens to be conducting. Thus, speed regulation of the pilot motor M is obtained so that rapid electrode positioning occurs when the difference between the actual load current and the desired load current is large. The effect is that of scaling the motor speed in substantially direct porportion to the magnitude of the error at the source.

Magnetic amplifiers ME1 and ML1 serve as mixing stages so that signal mixing and switching may take place ahead of the speed regulator that includes the voltage and power amplification stages represented respectively in magnetic amplifiers ME1, ML1 and magnetic amplifiers MA, MB, MC and MD. This makes it possible to bias magnetic amplifiers ME and ML to their effective cut off points. Therefore, at the time either limit switch ELS or LLS is actuated and the corresponding pattern field circuit interrupted speed feedback represented in the differentially acting ampere turns of respective control windings EC and LC is able to bring the pilot motor to rest by plugging. With this arrangement even a small speed feedback signal is quite effective. The provision of plugging in such a system is highly desirable since the inertia of the system actuated by the pilot motor is fairly large, as a general rule. Thus, the provision of high decelerating torque on the pilot motor drive for very accurate stopping, especially at each limit of travel, as well as under conditions of small electrode separation, affords a control which is especially desirable in this application.

From the foregoing considerations it will be appreciated that the objects of this invention have been accomplished in a system involving no rotating equipment excepting of course the motor or motors to be controlled and which compares favorably with direct current variable voltage drives in respect of adjustable speed control, reversible operation affording continuous control without the use of reversing contactors, and good speed regulation with changes in load. Moreover this control is accomplished without the use of rotating machines with the exception of the alternating current motor or motors to be controlled, which, as a general rule, are lower in cost than comparable D. C. machines.

With an alternating current motor of the type described (such as motor M) maintenance is minimized due to the absence of a commutator. System maintenance is further minimized because of the use of the static amplifiers involving no moving parts. Moreover amplifiers of this type are extremely rugged and if properly matched to system demands are capable of giving long useful service. Still further, the reversible motor speed regulating system offers advantages over D. C. drives of the type mentioned in that torque limit is inherent in the characteristic of an alternating current motor, such as a squirrel-cage motor, so that the complicated current limit schemes frequently used with variable voltage D. C. drives are eliminated.

It will be appreciated that numerous variations within the principles of this invention both as to organization and as to components may be obtained. As an example, it will be appreciated that in place of the magnetic amplifiers, saturable core reactors may be employed. Moreover other variable impedance devices may be utilized in keeping with conventional practice. Schemes such as this may also employ electronic control devices. These principles may also be practiced in systems involving more than the three phases indicated. Accordingly, it is intended that the foregoing disclosure and the illustrations of the several figures shall be considered only as illustrative of the principles of this invention and not interpreted in a limiting sense.

We claim as our invention:

1. A reversing control for a three-phase alternating current motor comprising, four magnetic amplifiers each having a main winding circuit, a pair of control windings and a bias winding; three supply conductors for the motor, three of said four magnetic amplifiers having the respective main winding circuits thereof connected in the respective conductors, a transformer having one winding connected across one phase of said supply conductors and a second winding connected across another phase of said supply conductors in series with the main winding circuit of the fourth magnetic amplifier, means for supplying a bias voltage to each bias winding to bias each magnetic amplifier to minimum output, means comprising forward and reverse magnetic amplifiers selectively operated in dependence of reversible input voltages for selectively applying control voltages of reversed polarity to the respective control windings of each magnetic amplifier, said fourth magnetic amplifier and one of said three magnetic amplifiers responding in opposite senses to control voltages of the same polarity, the remaining two of said three magnetic amplifiers responding and operating in response to control voltages of each polarity, speed responsive means connected to and controlled by said motor and having an output circuit connected to apply reversible input voltage to both said forward and reverse magnetic amplifiers, and transformer means having an input circuit connected to the supply conductors of said motor and having an output circuit connected to apply input voltage to both said forward and reverse magnetic amplifiers.

2. A reversing control for a three-phase alternating current motor comprising, four magnetic amplifiers each having a main winding circuit, a pair of control windings and a bias winding; three supply conductors for the motor, three of said four magnetic amplifiers having the respective main winding circuits thereof connected in the respective conductors, a transformer having one winding connected across one phase of said supply conductors and a second winding connected across another phase of said supply conductors in series with the main winding circuit of the fourth magnetic amplifier, means for supplying a bias voltage to each bias winding to bias each magnetic amplifier to minimum output, a pair of magnetic amplifiers selectively responsive in opposite senses to control voltages of reversed polarity and producing reversed polarity outputs, circuit means connecting the output of one of said pair of magnetic amplifiers to corresponding control windings of said four magnetic amplifiers, circuit means connecting the output of the other of said pair of magnetic amplifiers to the remaining control windings of said four magnetic amplifiers, said fourth magnetic amplifier and one other of the four magnetic amplifiers responding in opposite senses to control voltages of the same polarity, the two of the four magnetic amplifiers responding and operating in response to control voltages of each polarity.

3. A control for an alternating current motor comprising, a variable impedance device connected in each supply conductor of the motor, phase reversing variable impedance means connected to supply conductors of the motor, each variable impedance device and said variable impedance means having a pair of impedance varying control devices, a pair of control voltage producing variable impedance devices each having an impedance varying control element, the output of one of the pair of variable impedance devices being connected to a control device of each of the first-mentioned variable impedance devices and to a control device of said variable impedance means and the output of the other of said pair of variable impedance devices being connected to the remaining control device of each of the first-mentioned variable impedance devices and to the remaining control device of the variable impedance means, the respective outputs of said pair of variable impedance devices being of opposite polarity, said control elements affecting selective operation of said pair of variable impedance devices in response to voltages of the same polarity simultaneously applied to both of said control elements, means for applying a voltage of selectable polarity to both control elements, one of said first-mentioned variable impedance devices and said variable impedance means being selectively operable depending upon the polarity of control voltage output of that one of said pair of variable impedance devices which is operating, the remaining of said first-mentioned variable impedance devices responding to and operating irrespective of the polarity of control voltage applied to the control elements thereof by said pair of variable impedance devices.

4. A control for an alternating current motor comprising, conductors for applying multiphase alternating current to said motor, a magnetic amplifier connected in series in each supply conductor, an additional magnetic amplifier, phase shifting means connecting said additional magnetic amplifier to said supply conductors, circuit means comprising forward and reverse magnetic amplifiers selectively operated in dependence of reversible input voltages for applying a control voltage of selectable polarity to all said magnetic amplifiers, said additional magnetic amplifier and one of the first-mentioned magnetic amplifiers responding in opposite senses to control voltages of the same polarity to be selectively operable, the remaining of said first mentioned magnetic amplifiers operating in response to control voltages of each polarity, speed responsive means connected with said motor and having an output circuit connected with both said forward and reverse magnetic amplifiers to apply reversible input voltage thereto, said speed responsive means having a reversible output voltage depending upon the direction of rotation of said motor, and circuit means connected to said motor and responsive to the rate-of-change of motor terminal voltage and having an output circuit connected to both said forward and reverse magnetic amplifiers to apply input voltage thereto.

5. A slip regulator for an alternating current wound rotor induction motor having resistance means and adjustable means for varying said resistance means to vary the speed of the induction motor comprising, an alternating current pilot motor for driving said adjustable means, a variable impedance means connected in series in each pilot motor supply conductor, an additional variable impedance means, each variable impedance means having control means, a pair of selectively operable control devices, each control device being connected to all said control means to energize said control means, said additional variable impedance means decreasing in impedance upon energization by one control device, one of said first-named variable impedance means decreasing in impedance upon energization by the other control device, the remaining of said first-named variable impedance means decreasing in impedance upon energization by either of said control devices, circuit means connecting said additional variable impedance means in reversed phase relationship to the same pilot motor supply conductor as said one variable impedance means, and means responsive to an electrical quantity of said wound rotor induction motor for selectively operating said pair of control devices.

6. A slip regulator for an alternating current wound rotor induction motor having resistance means and adjustable means for varying said resistance means to vary the speed of the induction motor comprising, an alternating current pilot motor for driving said adjustable means, a variable impedance means connected in series in each pilot motor supply conductor, an additional variable impedance means, each variable impedance means having control means, a pair of selectively operable control devices, each control device being connected to all said control means to energize said control means, said additional variable impedance means decreasing in impedance upon energization by one control device, one of said first-named variable impedance means decreasing in impedance upon energization by the other control device, the remaining of said first-named variable impedance means decreasing in impedance upon energization by either of said control devices, circuit means connecting said additional variable impedance means in reversed phase relationship to the same pilot motor supply conductor as said one variable impedance means, a pair of amplifiers respectively connected to said control devices to control said control devices, biasing means for one amplifier normally biasing said one amplifier to conduct and biasing means for the other amplifier normally biasing said other amplifier so that it is at minimum conduction, and respective biasing means for said amplifiers responsive to an electrical quantity of said wound rotor induction motor for biasing said one amplifier toward minimum conduction and said other amplifier towards conduction.

7. A slip regulator for an alternating current wound rotor induction motor having resistance means and adjustable means for varying said resistance means to vary the speed of the induction motor comprising, an alternating current pilot motor for driving said adjustable means, a variable impedance means connected in series in each pilot motor supply conductor, an additional variable impedance means, each variable impedance means having control means, a pair of selectively operable control devices, each control device being connected to all said control means to energize said control means, said additional variable impedance means decreasing in impedance upon energization by one control device, one of said first-named variable impedance means decreasing in impedance upon energization by the other control device, the remaining of said first-named variable impedance means decreasing in impedance upon energization by either of said control devices, circuit means connecting said additional variable impedance means in reversed phase relationship to the same pilot motor supply conductor as said one variable impedance means, a pair of amplifiers respectively connected to said control devices to control said control devices, biasing means for one amplifier normally biasing said one amplifier to conduct and biasing means for the other amplifier normally biasing said other amplifier so that it is at minimum conduction, respective additional biasing means for each amplifier, a current transformer connected to the wound rotor induction motor to be energized in dependence of load current, and circuit means connecting said transformer to both of said additional biasing means, increasing current biasing said one amplifier toward minimum conduction and biasing said other amplifier toward conduction.

8. A slip regulator for a wound rotor induction motor having resistance means in the secondary circuit thereof including adjustable means for controlling the resistance comprising, an alternating current pilot motor for driving said adjustable means, reversing means for said pilot motor comprising a pair of selectively operable control means, a pair of amplifier systems respectively connected to said pair of control means, one amplifier being biased to conduct and the other amplifier being biased for minimum conduction, and respective biasing means for said amplifiers responsive to an electrical quantity of said wound rotor induction motor for oppositely controlling said amplifiers.

9. A slip regulator for a wound rotor induction motor having resistance means in the secondary circuit thereof including adjustable means for controlling the resistance comprising, an alternating current pilot motor for driving said adjustable means, reversing means for said pilot motor comprising a pair of selectively operable control means, a pair of amplifier systems respectively connected to said pair of control means, one amplifier being biased to conduct and the other amplifier being biased for minimum conduction, a current transformer connected to said motor to be energized in dependence of load current, respective biasing means on said amplifiers connected to said current transformer to be energized thereby, said respective biasing means decreasing conduction of said one amplifier and increasing conduction of said other amplifier.

10. Apparatus for controlling the impedance of the secondary circuit of a wound rotor induction motor comprising, an alternating current pilot motor, reversing means for the pilot motor including a pair of selectively operable motor reversing members, and means for selectively operating said reversing members comprising respective amplifier means, biasing means biasing one amplifier to conduct and biasing means biasing the other amplifier to minimum conduction, and respective additional biasing means for said amplifiers electrically connected to said wound rotor induction motor to respond to an electrical quantity thereof and oppositely control said amplifiers.

11. Apparatus for controlling the impedance of the secondary circuit of a wound rotor induction motor comprising, a pilot motor for varying the impedance of said secondary circuit, reversing means for controlling the pilot motor, a pair of amplifiers connected to the reversing means to control the reversing means and reverse the pilot motor, biasing means biasing one amplifier into the conducting range thereof and biasing the other amplifier to minimum conduction, and additional biasing means for each amplifier connected with said wound rotor induction motor and responsive to an electrical quantity thereof to bias said one amplifier toward minimum conduction as said electrical quantity increases and to bias said other amplifier toward conduction as said electrical quantity increases.

12. Apparatus for controlling the impedance of the secondary circuit of a wound rotor induction motor comprising, a pilot motor for varying the impedance of said secondary circuit, reversing means for controlling the pilot motor, a pair of amplifiers connected to the reversing means to control the reversing means and reverse the pilot motor, biasing means biasing one amplifier into the conducting range thereof and biasing the other amplifier to minimum conduction, additional biasing means for each amplifier connected with said wound rotor induction motor and responsive to an electrical quantity thereof to bias said one amplifier toward minimum conduction as said electrical quantity increases and to bias said other amplifier toward conduction as said electrical quantity increases, means responsive to the speed of said pilot motor for producing an electrical quantity, and means responsive to the difference of said first-named and said last-named electrical quantities for controlling said pilot motor.

13. In a slip regulator for controlling the secondary circuit resistance of a wound rotor induction motor wherein a movable member controls the secondary circuit resistance, the combination of, a pilot motor for driving the movable member, reversing means for reversing the direction of rotation of the pilot motor, circuit means responsive to a departure of an electrical quantity of said motor from a given value for controlling said reversing means, circuit means for producing an electrical quantity indicative of the speed of said pilot motor, and means responsive to the differential of said first-named and said last-named electrical quantities for controlling the speed of said pilot motor.

14. A reversing control for a motor adapted for excitation with multiphase alternating current comprising, a plurality of supply conductors for the motor, a magnetic amplifier connected in series in each supply conductor, an additional magnetic amplifier, biasing means biasing each magnetic amplifier to minimum output, said additional magnetic amplifier and one of said first mentioned magnetic amplifiers responding in opposite senses to control voltages of the same polarity, one producing an output voltage and the other remaining at minimum output, the remaining of the first mentioned magnetic amplifiers producing output voltage in response to control voltage of each polarity, and forward and reverse magnetic amplifiers selectively operated in dependence of reversible input voltages selectively applying control voltages of one polarity and the reverse to all said magnetic amplifiers.

References Cited in the file of this patent

UNITED STATES PATENTS

| | | |
|---|---|---|
| 2,228,078 | Gulliksen | Jan. 7, 1941 |
| 2,550,569 | Lamm et al. | Apr. 24, 1951 |
| 2,565,157 | Wickerham | Aug. 21, 1951 |